Dec. 24, 1935.  A. F. JABUSCH  2,025,349
SIGNAL FOR LEFT TURN
Filed Oct. 17, 1929
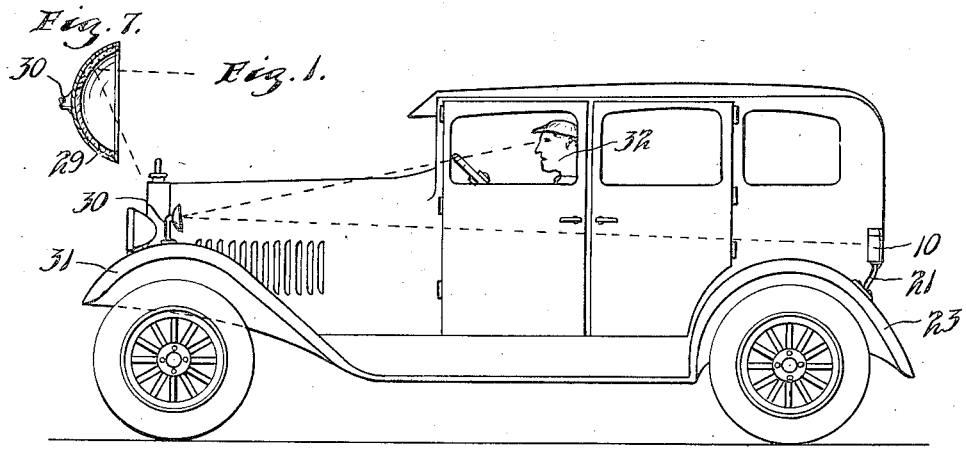
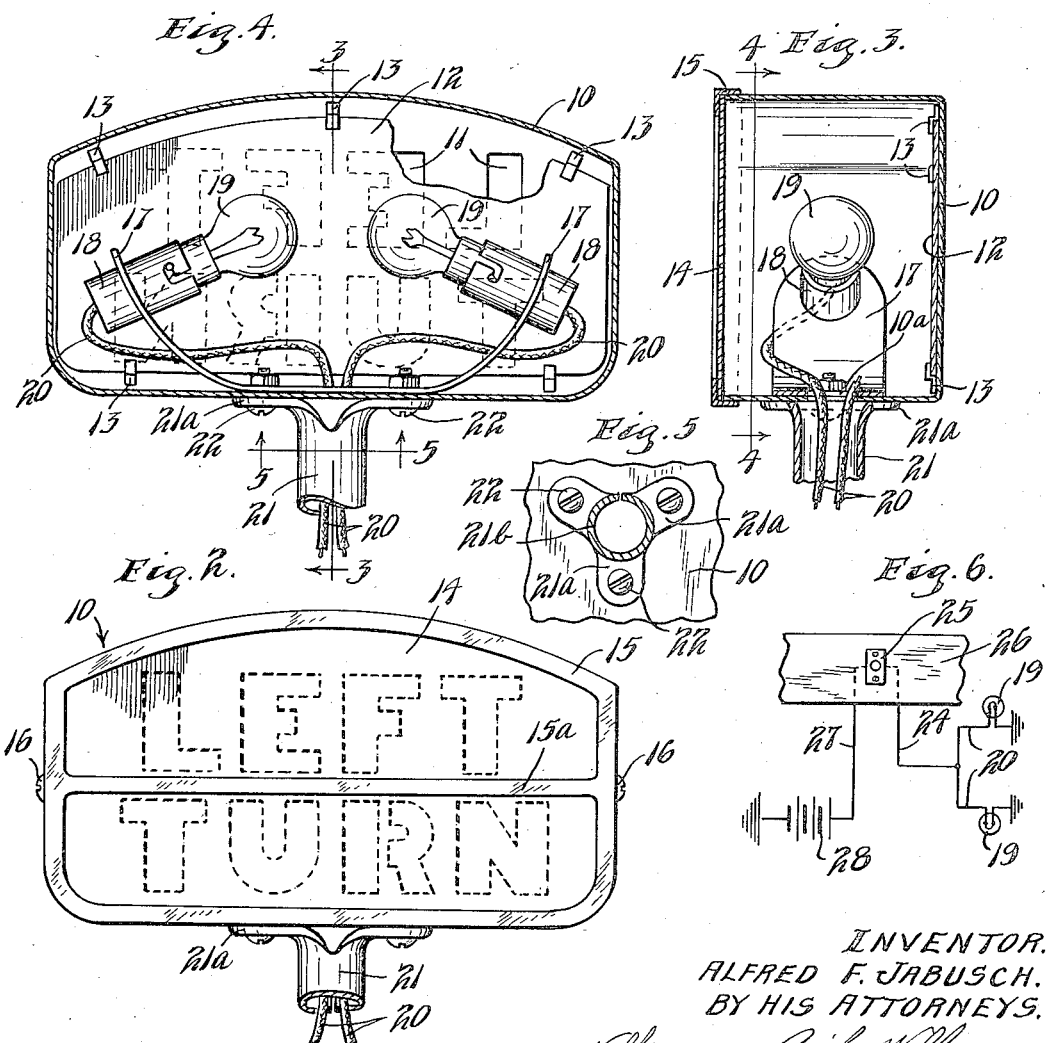
INVENTOR.
ALFRED F. JABUSCH.
BY HIS ATTORNEYS.

Patented Dec. 24, 1935

2,025,349

UNITED STATES PATENT OFFICE 2,025,349

SIGNAL FOR LEFT TURN

Alfred F. Jabusch, Hopkins, Minn., assignor to John Ralph Haines, Medford, N. J.

Application October 17, 1929, Serial No. 400,280

2 Claims. (Cl. 177—329)

This invention relates to a signal device and while the invention might be applied to various signals, it particularly is designed for a left turn signal for an automobile. As is well known, it is quite desirable that the intention to make a left turn in an automobile be signaled to the drivers of automobiles both at the front and rear of said automobile. It is also desirable to have a simple and efficient means for this purpose, together with means informing the driver of the automobile that the signal is in proper working condition.

It is an object of this invention, therefore, to provide a signal for an automobile which can be easily and quickly operated to signal the intention of the driver to make a left turn, said signal being visible from the front and rear of the automobile.

It is a further object of the invention to provide a simple and efficient signal for signaling a left turn, the same being located at one side and adjacent the rear of the automobile, together with means for informing the driver that the signal is in proper working condition and enabling the signal to be seen by cars at the side of the automobile.

It is more specifically an object of the invention to provide a left turn signal for an automobile comprising an integral casing open at its rear side having the words "Left turn" cut from one side thereof, a plate of colored translucent material over-lying said words, a plate at the other side of said casing having the words "Left turn" thereon, said latter plate being of translucent material together with means for holding said latter plate in position and means for illuminating said words "Left turn" at the sides of said signal.

These and other objects and advantages of the invention will be fully set forth in the following description made in connection with the accompanying drawing, in which like reference characters refer to similar parts throughout the several views, and in which:—

Fig. 1 is a view of an automobile in side elevation showing the invention applied thereto;

Fig. 2 is a view in elevation of one side of the casing used;

Fig. 3 is a vertical section taken on line 3—3 of Fig. 4 as indicated by the arrows;

Fig. 4 is a vertical section taken on line 4—4 of Fig. 3, as indicated by the arrows;

Fig. 5 is a horizontal section taken on line 5—5 of Fig. 4, as indicated by the arrows;

Fig. 6 is a diagrammatic view of the wiring arrangement, and

Fig. 7 is a horizontal section through a reflector used.

Referring to the drawing, a signal device is shown comprising a casing designated generally as 10. While this casing may be variously formed, in the embodiment of the invention illustrated it is shown as made from sheet metal and being of general rectangular form with a slightly rounded top, the top, bottom, ends and one side of said casing being integral. The integral side of the casing has cut therein letters 11 forming the words "Left turn", said words being superposed. A plate 12 of translucent colored material, preferably of red color over-lies the letters 11 being disposed against the inner surface of the side of said casing. Plate 12 may be held in place by any suitable means, such as the small clips 13 spot-welded to or otherwise secured to casing 10. A plate 14 of thin translucent colored material which also is preferably red in color, is of the same shape as casing 10 and fits against the edge of the open side of said casing, the edges of said sheet being flush with the exterior of the casing. Said plate 14 also has the words "Left turn" formed thereon. While these words may be variously formed on said plate, in the embodiment of the invention illustrated they are formed by coating the inner side of said plate with some dark coating such as dark paint around the outside of said words thus leaving said words exposed. The outer side of plate 14 is coated with a colored coating, preferably red.

Plate 14 is held in place by an open-work frame 15 shaped similarly to the edge at casing 10 and over-lapping said edge at the top, bottom and ends.

Said frame 15 is held in place by screws 16 at the ends thereof which engage casing 10. Frame 15 has narrow portions extending about the rear of the casing and has a central portion 15a extending horizontally thereacross which will be disposed between the words "Left" and "Turn". A plate or bracket 17 is disposed inside of the casing the same comprising a strip of material with rounded ends having a horizontal central portion and upwardly curved end portions. Lamp sockets 18 are secured in the upwardly bent ends of member 17, the same being constructed and arranged to receive the usual lamp bulbs 19 such as used for automobile illumination. Conductors 20 are provided connected to sockets 18 to supply electrical current to the bulbs 19, said conductors 20 passing downwardly through an opening 10a formed in the bottom of casing 10 and in plate 17. A bracket 21 is secured to the bottom of casing 10 having a plurality of outwardly bent lugs 21a thereon shown as three in number. Screws 22 extend through lugs 21a through the bottom of the casing and plate 17 and are provided with nuts at the inner side of plate 17. Casing 10 and plate 17 are thus firmly secured to bracket 21. Bracket 21 is made from a single blank of material and at its intermediate portion is shaped as a tube or conduit 21b, said bracket also having outwardly diverging lugs similar to lugs 21a at its bottom portion adapted to be attached to some part of the automobile. As shown in Fig. 1 the lower end of the bracket is attached to the fender 23 of the automobile shown. One of the conductors 20 extending from each lamp socket 18 will be connected to ground, as to the frame of the automobile as indicated in Fig. 6 and the other conductor from each socket will be connected to a common conductor 24 which will extend to a switch 25 preferably located on the instrument board 26 of the automobile. A conductor 27 will extend from switch 25 to the battery 28 of the automobile, one side of which is also connected to ground, as to the frame of the automobile.

A reflector or mirror 29 is supported adjacent the front of the automobile and while this might be supported at various places in the embodiment of the invention illustrated it is shown as having a bracket 30 secured thereto attached to the top of the front fender 31 of the automobile, said reflector thus being in substantial alignment with the signal casing 10. It will be noted that casing 10 is secured at one side of the automobile adjacent the rear end and with its rear side substantially flush with the rear side of the body of the automobile. Said casing 10 is thus supported at sufficient height so that it can be seen from the front of the automobile.

In operation, with the parts disposed as described, when the driver is about to make a left turn he will operate switch 25. This can easily be done as the switch is in a convenient position to be reached by the driver. This will illuminate lamps 19 and the words "Left turn" will be illuminated and displayed prominently at the front and rear sides of casing 10. The drivers of automobiles both in the rear and in the front of the automobile can therefore see the signal and know that a left turn is to be made. The light from the front of casing 10 will be reflected by the reflector or mirror 29 and the driver 32 of the automobile can see if the signal illuminates as indicated by the dotted lines in Fig. 1. The mirror or reflector being of concave form, some of the light will also be reflected at the side of the automobile as indicated in Fig. 7. The driver of a car therefore which is in front of casing 10, but in the rear of reflector 29, or in other words, along-side of the automobile having the signal can also see that a left turn is contemplated as he will see the reflection in the mirror 29. Said mirror therefore not only acts to inform the driver that the signal is in working order, but also functions to signal drivers at the side of the car that a left turn is to be made.

From the above description it is seen that applicant has provided a very simple and efficient left turn signal and one which will function to signal drivers at the front and rear and left side of the automobile that a left turn is to be made. The device is quite simple in construction and can be inexpensively produced and installed. The same is neat, and compact in appearance and will make a nice appearance on an automobile. The same will of course be nicely finished in accordance with the finish of the automobile. The device has been amply demonstrated in actual practice and found to be very successful and efficient.

It will, of course, be understood that various changes may be made in the form, details, proportions and arrangement of the parts, without departing from the scope of applicant's invention, which, generally stated consists in a device capable of carrying out the objects above set forth, in the novel parts and combinations of parts disclosed and defined in the appended claims.

What is claimed is:

1. In a turn signal device for an automobile, a casing, a plate within said casing having a portion engaging a wall thereof and having free curved end portions spaced from said wall, spaced lamp sockets supported in said curved end portions, a supporting bracket for said casing having at one end lugs engaging the outer surface of said wall in alinement with said first mentioned portion of said plate, securing means passing through said lugs, casing and plate and connecting the same, said plate and casing having alining openings therethrough and said bracket forming a conduit adjacent said openings and being constructed and arranged at its other end to be secured to said automobile and conductors for said lamp sockets extending through said openings and conduit.

2. In a turn signal device for vehicles, a casing, a plate within the casing having a portion engaging a wall of the casing and another portion extending inwardly from said wall, a lamp socket supported on said inwardly extending portion, a casing support having means engaging said wall of the casing at the exterior thereof in substantial alignment with the wall engaging portion of said plate, securing means passing through said support, casing and plate, and connecting the same together, means on the other end of said support for attaching the same to a vehicle, said support, casing and plate being provided with aligned openings for the passage of conductors for said lamp socket.

ALFRED F. JABUSCH.